Jan. 31, 1956   D. E. DREW ET AL   2,732,887
HEAT-SEALING OF THERMOPLASTIC FILM
Filed April 2, 1951
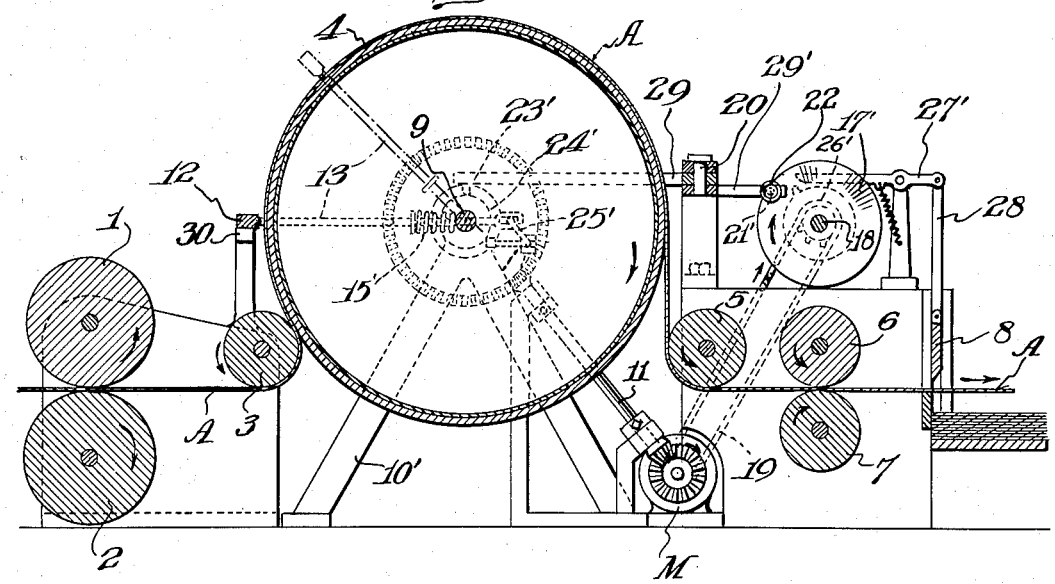
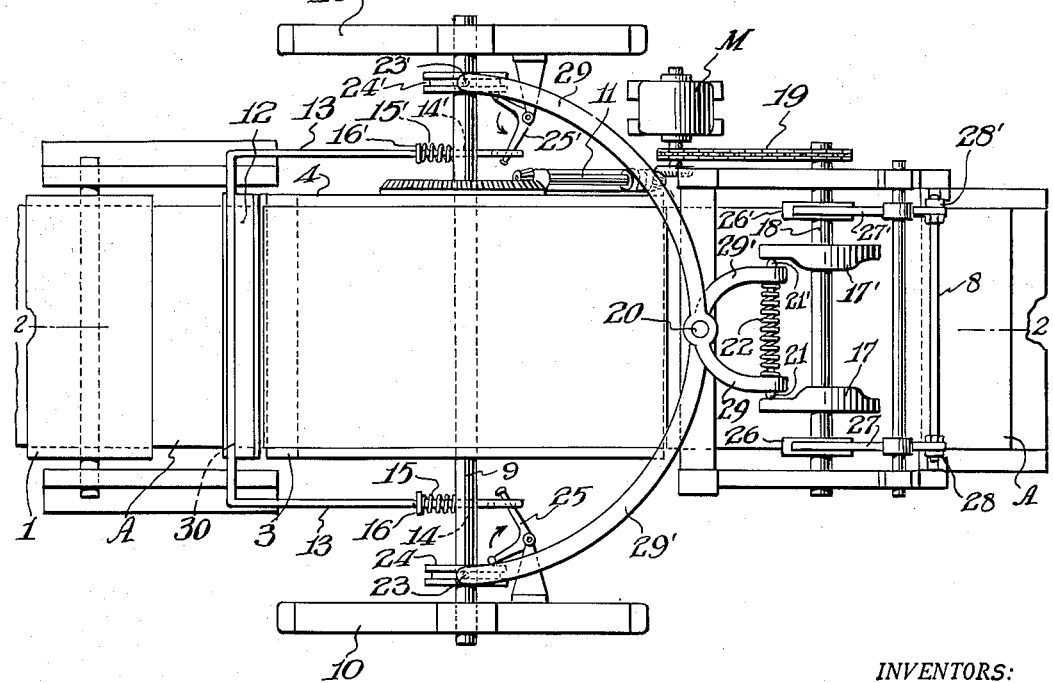
INVENTORS:
DONALD ELLSWORTH DREW
and WALTER MEAD FARRELLY
BY
ATTORNEY.

United States Patent Office 2,732,887
Patented Jan. 31, 1956

2,732,887

HEAT-SEALING OF THERMOPLASTIC FILM

Donald Ellsworth Drew, Claymont, and Walter Mead Farrelly, Wilmington, Del., assignors to E. I. du Pont de Nemours & Company, Wilmington, Del., a corporation of Delaware Application April 2, 1951, Serial No. 218,754

2 Claims. (Cl. 154—42)

This invention relates to the heat-sealing of films of thermoplastic materials and more particularly to novel heat-sealing means adaptable to continuous motion bag machines used in the manufacture of bags from films of polyethylene and like thermoplastic materials.

When heat-sealing polyethylene and other thermoplastic films, it has been found desirable to incorporate a cooling period in the cycle of any automatic machine used for such purpose in order to allow the seal to set and regain its strength after being brought to the sealing temperature. Seals which are placed under even a slight strain while the film at the seal is still hot and plastic, will be badly distorted, thinned out or puckered.

In making such heat seals, it is conventional practice to use a heated sealing element, usually a heated bar, which is either coated or shielded by a barrier material to prevent sticking to the plastic; said heated element is then pressed against the material to be sealed, supported on a resilient backing member, under controlled conditions of time, temperature and pressure. This comprises the first or dwell part of the cycle. The heated sealing element is then removed and the sealed material allowed to cool slightly before being removed from the resilient backing member. Cooling may be hastened by a blast of air, or suitable other means. This comprises the second or cooling part of the cycle. The material is then moved from the sealing position and a new section of the material moved into position. This constitutes the complete sealing cycle.

The time required to effect the sealing cycle is determined by both the minimum heating time and minimum cooling time necessary for the particular plastic film being handled. Heating time is shortened by raising the temperature but such temperature is generally limited by such practical considerations as the temperatures to which the coatings or barrier materials can be safely raised, melting of the surface of the plastic film being sealed, etc. For instance, the shortest practical dwell time for 1½ mil polyethylene film has been determined to be approximately $\frac{1}{10}$ second, but with heavier material or different types the dwell time may be much longer. Cooling times are definitely limited by the method of cooling and gauge of the plastic film being handled and will vary from a minimum of approximately ¼ second to several seconds.

Such a method of making seals lends itself well to machines of the intermittent type, but the speed of operation is definitely limited by the requirements of both the dwell and cooling parts of the cycle. Continuous motion machines have been unable, heretofore, to provide this cooling time, without the use of slip sheeting, and resultant seals are generally not as strong nor as of good appearance as those produced on machines of the intermittent type.

An object of this invention is to provide a method and means for heat-sealing traveling continuous film of heat-sealable thermoplastic material.

Another object is to provide a heat-sealing device for use on continuous motion bag machines.

A further object is to provide means for transversely heat-sealing a traveling continuous tubing of polyethylene without interrupting the travel of said tubing. These and other objects will more clearly appear hereinafter.

Briefly stated, the present invention, by which these objects are realized, comprises a driven drum or roll of suitable diameter and width interposed between the tube forming part of a bag machine, if using flat stock, and the cut-off knife. By means of suitably arranged guide rolls the thermoplastic tubing is made to travel around a substantial portion of the circumference of the drum. The drum itself is covered with some suitable heat resisting, resilient material such as silicone rubber or neoprene. A heat-sealing element, which may be any one of several types in current use, i. e., directly heated coated bar, impulse type, bare bar sealing through a barrier material or any other suitable device, is brought to bear against the thermoplastic tubing supported on the surface of the drum and moves with the drum and tubing for the interval of time required to seal the particular material being handled that shall correspond to approximately ¼ to ½ of the machine cycle; the sealing element is then raised from the drum and returned to its starting position ready for the next seal. The newly made hot seal continues to be supported by the drum until the drum turns to the position at which the tube leaves the drum. The time and space interval between the sealing position and stripping provides the cooling space and period. It is obvious that a drum size will be selected that will provide sufficient cooling time to meet the requirements of the type and gauge of material to be handled.

The nature of the invention will be more clearly apparent from the following detailed description to be read with reference to the accompanying drawing, wherein:

Figure 1 is a top plan view of a preferred embodiment of our invention, and

Figure 2 is a cross-sectional view on the line 1—1 of Figure 1.

Referring to the figures of the drawings, reference numerals 1 and 2 indicate feed rolls such as are commonly used on bag machines to forward tubing to the sealing mechanism. In the present arrangement, feed rolls 1 and 2 advance tubing A to a guide roll 3 which guides the tubing onto roll or drum 4, preferably covered with a resilient heat-resistant material such as silicone rubber or neoprene upon which the tubing is carried to a point where it is guided by guide roll 5 to feed rolls 6 and 7 which cooperate to feed the tubing to the knife 8 of the bag machine, at which point the tube is severed into predetermined lengths. Drum 4 is mounted for rotation about axle 9 which, in turn, is suitably mounted for limited rotation on machine frame members 10 and 10'. A motor M is linked to drum 4 by means of positive driving means 11 and is operated to drive the drum at the same surface speed as the tubing feed rolls of the bag machine. A sealing element, preferably in the form of an electrically heated bar 12 (heating means not shown), is mounted on a U-shaped support 13 which straddles the drum 4 adjacent guide roll 3. The free ends of support 13 each have a closed slot and extend thru holes 14 and 14' provided near the ends of axle 9. Coil springs 15 and 15', fitted over the free ends of support 13 between stop collars 16 and 16' and the axle, tend to urge the bottom portion of support 13 and, hence, sealing element 12 away from the surface of the drum. A suitable stop 30 provides a rest for element 12 in its inoperative position. An arrangement of cams and levers operates to force element 12 into contact with the tubing and the drum and to release said element after a predetermined contact-time interval has elapsed. This arrangement comprises twin cams 17 and 17' fixed to cam shaft 18, also driven by motor M thru chain 19. Twin bell cranks 29 and 29' pivoted at 20 to form a tong are provided with cam followers 21 and 21' mounted at the free end of the shorter arms of bell cranks 29 and 29' respectively, which followers are urged into contact with the cam faces of cams 17 and 17' by means of compressed spring 22. The longer arms of the bell cranks straddle drum 4 and are fitted at their free ends with pins 23 and 23' which ride in circumferential grooves of twin discs 24 and 24' slidably mounted on and near the outer extremities of axle 9. These discs are linked to the arms of support 13 thru identical bell cranks 25 and 25' pivoted to the machine frame. One end of each bell crank bears against the side of the adjacent disc while the other end fits within the slot in support 13. A second set of twin cams 26 and 26' is also keyed to shaft 18 and is adapted to actuate knife 8 thru levers 27, 27', 28 and 28'.

Each time the knife 8 operates to sever one length of tubing, it is considered to have completed one cycle; and by reason of the mechanical interconnection, sealing element 12 also operates through its cycle with the same frequency as knife 8.

In practice the heat-sealing arrangement of this invention will be interposed between the tube-forming and tube-severing means of the conventional continuous motion bag machine, the tubing from the tube-forming means passing over the drum 4 upon which the sealing operation is carried out and thence to the tube severing means.

At the beginning of the sealing cycle cams 17 and 17', driven in concert with drum 4 from motor M, force the shorter arms of bell cranks 29 and 29' together against the action of spring 22 and this, in turn, forces the longer arms of the bell cranks 29 and 29' together, causing discs 24 and 24' to slide on axle 9 toward drum 4. Bell cranks 25 and 25' bearing against discs 24 and 24' turn about their pivots and, in so doing, pull the support 13 toward the drum and sealing element 12 into frictional engagement with the traveling tubing on the drum. The sealing element is thus carried with the drum until cams 17 and 17' rotate to a point to permit bell cranks 29 and 29' to move apart, at which point the sealing element is released from contact and falls of its own weight onto rest 30 or may be returned by positive spring action, or by any other suitable means. The newly-made hot seal continues to be supported by the drum to cool the same as previously described.

While this invention is particularly adapted to continuous motion bag machines, the principle of providing a traveling support for the seal during the cooling part of the cycle may also be applied with advantage to the intermittent type bag machine, in which event the sealing element and drum would remain stationary during the dwell part of the cycle. Provision of a moving support for the sealed tubing during cooling will insure against distorted, thinned-out or puckered film adjacent the seal, as hereinabove pointed out; and because the machine so modified need not remain stationary during the cooling part of the heating cycle, it is further evident that the application of this invention to intermittent type bag machines will also permit an increase in the speed of operation of the machines.

It is obvious, of course, that the foregoing description is for purposes of illustration only, and it will be evident that many variations and changes may be made without departing from the principles and spirit of our invention.

By employing this invention, it is possible to make heat sealed bags on continuous motion bag machines at high speed, the cycle speed being theoretically limited to about twice the time required to make the seal, as the sealing element must have time to return to its starting position after each seal. Even this limitation is removed if a suitable arrangement is made to have a plurality of sealing members which make the seals in turn so that two or more seals might be formed in overlapping cycles.

We claim:

1. Apparatus for heat-sealing a traveling continuous tubing of heat-sealable thermoplastic film material comprising in combination a drum provided with a surface adapted to permit cooling of heat-sealed tubing carried thereon, said drum being driven about a substantially horizontal fixed axis, means for guiding the traveling tubing onto said drum, a heated shiftable sealing bar disposed adjacent said drum substantially parallel to the horizontal axis thereof, means for bringing said bar into contact with said tubing on the drum at substantially the point where the tubing first contacts the drum and for maintaining said bar in contact with said tubing and drum and stationary with respect to the drum for a predetermined time interval, whereby the bar is caused to move with the drum and heat the tubing over the area to be sealed, means for shifting said bar out of contact with said tubing and drum after said time interval, means for returning said bar to its initial position, and means for maintaining said tubing on said drum after heating for a time interval sufficient to permit said tubing to cool.

2. In a bag machine comprising in combination means for forming continuous tubing of thermoplastic film, means for heat-sealing said tubing transversely at predetermined points, and cutting means for severing the sealed tubing into predetermined lengths whereby to form bags, the improvement which comprises in combination a drum provided with a surface adapted to permit cooling of heat-sealed tubing carried thereon, said drum being driven about a substantially horizontal fixed axis and located between the tube-forming means and the cutting means, means for guiding the continuous traveling tubing onto said drum, a heated shiftable sealing bar disposed adjacent said drum substantially parallel to the horizontal axis thereof, cam actuated means for bringing said bar into contact with the tubing and drum at substantially the point where the tubing first contacts the drum and for maintaining said bar in contact with said tubing and drum and stationary with respect to the drum for a predetermined time interval, whereby the bar is caused to move with the drum and heat the tubing over the area to be sealed, spring actuated means for shifting said bar out of contact with said drum after said time interval, means for returning said bar to its initial position, and means for maintaining said tubing on said drum after heating for a time interval sufficient to permit said tubing to cool.

References Cited in the file of this patent

UNITED STATES PATENTS

| Number | Name | Date |
| --- | --- | --- |
| 1,751,451 | Smith | Mar. 18, 1930 |
| 2,114,621 | Bergstein | Apr. 19, 1938 |
| 2,125,758 | Waters | Aug. 2, 1938 |
| 2,238,342 | Riehl | Apr. 15, 1941 |
| 2,273,452 | Snyder | Feb. 17, 1942 |
| 2,351,861 | Knowland et al. | June 20, 1944 |
| 2,467,879 | Billeb | Apr. 19, 1949 |
| 2,509,354 | Jones et al. | May 30, 1950 |
| 2,556,452 | Spalding | June 12, 1951 |
| 2,579,063 | Andrews | Dec. 18, 1951 |